US009739307B2

(12) United States Patent
Post (10) Patent No.: US 9,739,307 B2
(45) Date of Patent: Aug. 22, 2017

(54) NON-CONTACTING "SNUBBER BEARING" FOR PASSIVE MAGNETIC BEARING SYSTEMS

(71) Applicant: Lawrence Livermore National Security, LLC, Livermore, CA (US)

(72) Inventor: Richard F Post, Walnut Creek, CA (US)

(73) Assignee: Lawrence Livermore National Security, LLC, Livermore, CA (US)

(*) Notice: Subject to any disclaimer, the term of this patent is extended or adjusted under 35 U.S.C. 154(b) by 383 days.

(21) Appl. No.: 14/556,029

(22) Filed: Nov. 28, 2014

(65) Prior Publication Data

US 2016/0153491 A1   Jun. 2, 2016

(51) Int. Cl.
*H02K 7/09* (2006.01)
*F16C 32/04* (2006.01)
*F16C 15/00* (2006.01)

(52) U.S. Cl.
CPC .......... *F16C 32/0425* (2013.01); *F16C 15/00* (2013.01); *F16C 32/0429* (2013.01); *F16C 2361/55* (2013.01)

(58) Field of Classification Search
CPC .............................. H02K 7/025; H02K 7/09
USPC ................. 310/74, 90.5, 156.01–156.84
See application file for complete search history.

(56) References Cited

U.S. PATENT DOCUMENTS

| | | | |
|---|---|---|---|
| 4,841,212 A * | 6/1989 | Matsushita | F16C 32/0453 310/90.5 |
| 5,495,221 A | 2/1996 | Post | |
| 5,722,326 A | 3/1998 | Post | |
| 5,783,885 A | 7/1998 | Post | |
| 6,111,332 A | 8/2000 | Post | |
| 6,114,788 A * | 9/2000 | Vuillemin | F16C 32/0493 310/156.35 |
| 6,118,199 A | 9/2000 | Lembke | |
| 6,657,344 B2 | 12/2003 | Post | |
| 6,664,880 B2 | 12/2003 | Post | |
| 6,858,962 B2 | 2/2005 | Post | |
| 6,906,446 B2 | 6/2005 | Post | |
| 7,289,009 B1 | 10/2007 | Christenson et al. | |
| 2005/0184609 A1 * | 8/2005 | Chen | F16C 17/08 310/90.5 |
| 2007/0296367 A1 * | 12/2007 | Buhler | F16C 32/0442 318/607 |
| 2010/0283340 A1 * | 11/2010 | Fradella | H02K 7/025 310/74 |
| 2012/0098370 A1 | 4/2012 | Pinneo et al. | |
| 2012/0098371 A1 | 4/2012 | Pinneo et al. | |

(Continued)

OTHER PUBLICATIONS

Post, "Stability Issues in Ambient-Temperature Passive Magnetic Bearing Systems," Lawrence Livermore National Laboratory, 2000, 19 pp.

*Primary Examiner* — Thanh Lam
(74) *Attorney, Agent, or Firm* — John P. Wooldridge (57) ABSTRACT

A new non-contacting magnetic "snubber" bearing is provided for application to rotating systems such as vehicular electromechanical battery systems subject to frequent accelerations. The design is such that in the equilibrium position the drag force of the snubber is very small (milliwatts). However in a typical case, if the rotor is displaced by as little as 2 millimeters a large restoring force is generated without any physical contact between the stationary and rotating parts of the snubber bearing.

23 Claims, 6 Drawing Sheets

(56) References Cited

U.S. PATENT DOCUMENTS

2012/0156036 A1 6/2012 Smith et al.
2013/0088114 A1* 4/2013 Yamashita ............ H02K 1/278
 310/156.38

* cited by examiner

NON-CONTACTING "SNUBBER BEARING" FOR PASSIVE MAGNETIC BEARING SYSTEMS

STATEMENT REGARDING FEDERALLY SPONSORED RESEARCH OR DEVELOPMENT

The United States Government has rights in this invention pursuant to Contract No. DE-AC52-07NA27344 between the U.S. Department of Energy and Lawrence Livermore National Security, LLC, for the operation of Lawrence Livermore National Laboratory.

BACKGROUND OF THE INVENTION

Field of the Invention

The present invention relates to means for restraining the transverse displacement of the rotating elements of a system such as a flywheel rotor in the presence of accelerations of the system, and more specifically, it relates to a non-contacting means for achieving such restraint.

Description of Related Art

In some applications of systems employing magnetic bearings it is important to employ "snubbers" that restrain the transverse displacement of the rotating elements of the system (e.g., a flywheel rotor) in the presence of accelerations of the system. When such accelerations are infrequent, e.g., when they come from seismic events, touchdown bearings, a prior art type of snubber bearings, utilizing restraint by direct contact (and thus involving the possibility of frictional abrasion) can be used. However, due to the frictional loses, such touchdown bearings are not ideal when accelerations are frequent. Thus, non-contact snubber bearings are desirable for use when accelerations are frequent.

BRIEF DESCRIPTION OF THE DRAWINGS

The accompanying drawings, which are incorporated into and form a part of the disclosure, illustrate embodiments of the invention and, together with the description, serve to explain the principles of the invention.

DETAILED DESCRIPTION OF THE INVENTION

A non-contacting type of snubber bearing is needed for the case when accelerations are frequent, as they would be in a vehicular application of energy storage flywheels. This document describes a magnetically based snubber bearing that has the following properties: When the flywheel rotor is centered (as, for example, when it is levitated by one of the passive magnetic bearing systems developed at Lawrence Livermore National Laboratory), the snubber has very low losses so as not to compromise the energy storage times of the flywheel system. However, if a displacement of order a millimeter or two occurs as the result of an acceleration, the snubber bearing generates a large restoring force. This force is sufficient to restrain the rotor so that no physical contact, either with the stationary element of the snubber, or between other rotating and stationary parts of the system, can occur. In the computer-based simulations of the concept, accelerations of 10 g or more could be overcome with no physical contact, even with initial gaps of order 2 mm.

Figure 1:
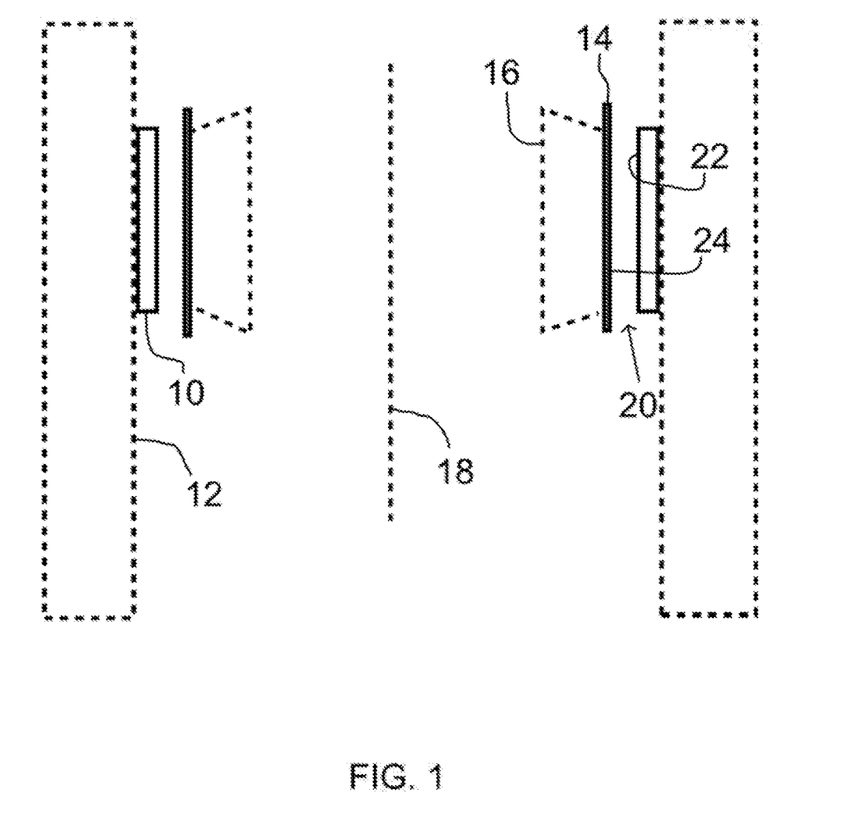
FIG. 1 is a schematic cross-sectional drawing of an embodiment of a non-contact snubber bearing according to the principles of the present invention.

FIG. 1 is a cross-sectional schematic drawing of an embodiment of the snubber according to the principles of the present invention. It consists of two main parts: (a), a Halbach array 10 having a very short wavelength (of order one or two millimeters), mounted on the inner surface of the flywheel rotor 12, and (b), an array 14 of litz wire segments (shown in cross-section) shorted together at their ends and attached to a stationary support 16. The array wraps around in a circle that is concentric with the longitudinal axis 18 of the system. Note the gap 20 between the Halbach array 10 and the array 14 of litz wire segments (closed circuits). The gap can be characterized as having a first boundary 22 at the face of the Halbach array 10 and can be further characterized as having a second boundary 24 at the face of the array 14. In embodiments discussed infra, one of the two boundaries is designed to be circular and the other is designed to be elliptical. To carry this out, in one case, the loop of Halbach arrays is configured to be circular and the loop of the circuits is configured to be elliptical. In another case, the loop of Halbach arrays is configured to be elliptical and the loop of the circuits is configured to be circular. As shown by Halbach's theory of his array, the magnetic field existing above the "active" surface of the array falls off exponentially with distance from the array, at a rate given Equation 1 below.

$$B(z) = B_0 \operatorname{Exp}\{-kz\} \quad (1)$$

Figure 2:
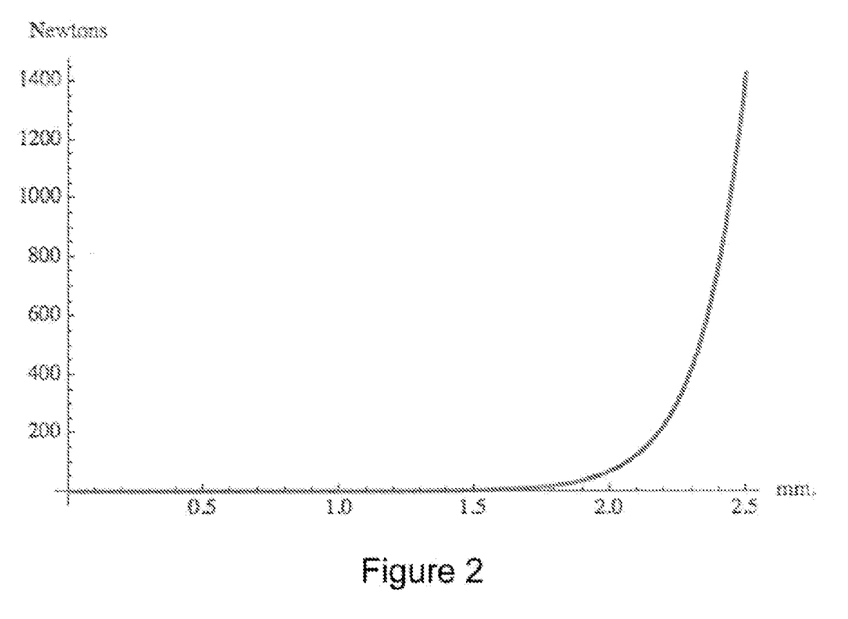
FIG. 2 shows the result of calculating the repelling force for a present snubber bearing having a circular Halbach array with a wavelength of 2.0 mm, a radius of 5.0 cm, and a vertical width of 2.0 cm.

Here $B_0$ (Tesla) is the magnetic field at the active surface of the array and $k = 2\pi/\lambda$, where $\lambda$ (meters) is the wavelength. Since the repelling force varies as $B^2$, if the wavelength of the Halbach is, for example, 2.0 mm, it, and the drag power associated with it will be negligible if the Halbach array is 2 to 3 mm away from the litz wire array, but will rise to a high value if the Halbach array comes within a mm of the litz wire array. This effect is depicted in FIG. 2, which shows the result of calculating the repelling force for a snubber having a circular Halbach array with a wavelength of 2.0 mm, a radius of 5.0 cm, and a vertical width of 2.0 cm. The array is composed of 2.0 cm-long, square-cross-section (0.5 mm×0.5 mm), NdFeB permanent magnet rods.

For the case described above the drag power at the centered position (zero displacement) is 17.5 milliwatts and the eddy current losses are 0.1 milliwatt. Also, since the flywheel rotor for which this snubber example has calculated weighed 7.5 kg, the figure shows that a 10 g momentary acceleration (a force of 750 Newtons) would be restrained by the snubber at a displacement of about 2.4 mm.

In one embodiment affording restraint of a flywheel rotor against transverse motion, a snubber is located at both top and bottom of the rotor. For the example case studied the rotor weighed 7.5 kg and stored 1.5 kwh when rotating at a speed of 100,000 rpm. As can be seen from FIG. 2, to restrain the rotor against a transverse acceleration of 10 g, the 750 Newtons force required would be generated by the snubber pair at a transverse displacement of about 2.2 mm.

Figure 3:
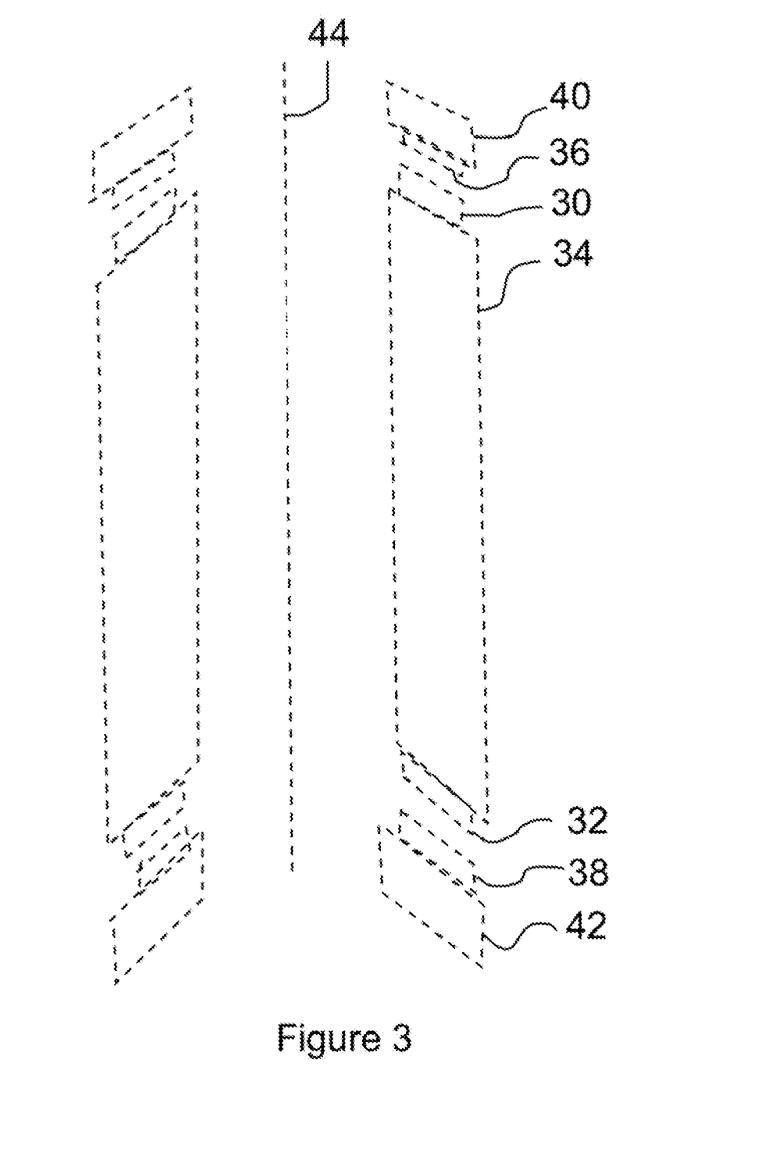
FIG. 3 shows the cross-section of a conical design which restrains the rotor against both transverse and axial accelerations.

The example snubber bearing described above is designed to restrain the rotor against transverse accelerations. FIG. 3 shows the cross-section of an alternative design, one which could restrain the rotor against both transverse and axial accelerations. This design uses top and bottom Halbach arrays 30,32 attached to rotor 34 and conductor arrays 36, 38 attached to stationary supports 40, 42, respectively. The rotor, Halbach arrays and the conductor arrays have a conical shape. Note the longitudinal axis 44. In another embodiment, the conical shape could be in the opposite direction such the longer side of the rotor is the outer surface. If only required to restrain axial accelerations, a planar rotor, Halbach arrays and conductor arrays could be used where the plane is perpendicular to the longitudinal axis. Another embodiment requires only the conical shape at the bottom of rotor 34 which also includes the Halbach array 32 and circuit array 38 and does not include the Halbach array 30 and circuit array 36. One way to provide radial and tilt stability is to include, at the upper portion of the rotor 34, the Halbach array and circuit array configuration of FIG. 1. Thus, the use of the Halbach array proximate to the circuit array, in accordance with the teachings of the present invention, can be used to provide stability to a rotor in a variety of ways.

The snubber could be designed to stabilize whirl instability (originating from drag forces that are dependent on radial displacement perturbations of the rotor) through making the radial stiffness of the magnetic bearing system anisotropic. This anisotropy could be introduced by making either the stator or the rotor very slightly elliptical in shape. The ellipticity should be much smaller than the gap between the short-wavelength Halbach array of the snubber and the closed circuit array. A code was written to model the instability. In the code a rotating system having a bearing the azimuthal drag force of which increased with lateral displacement showed an exponential growth of the initial displacement, but was stabilized by introducing a very small amount of anisotropy into the radial stiffness of the bearing. Since the high-stiffness snubber has a displacement-drag force it could drive whirl instability itself. However, by making the rotor or the stator very slightly elliptical the snubber could not only stabilize its own whirl instability but also that from other elements of the bearing system if such instability is present.

Figure 4:
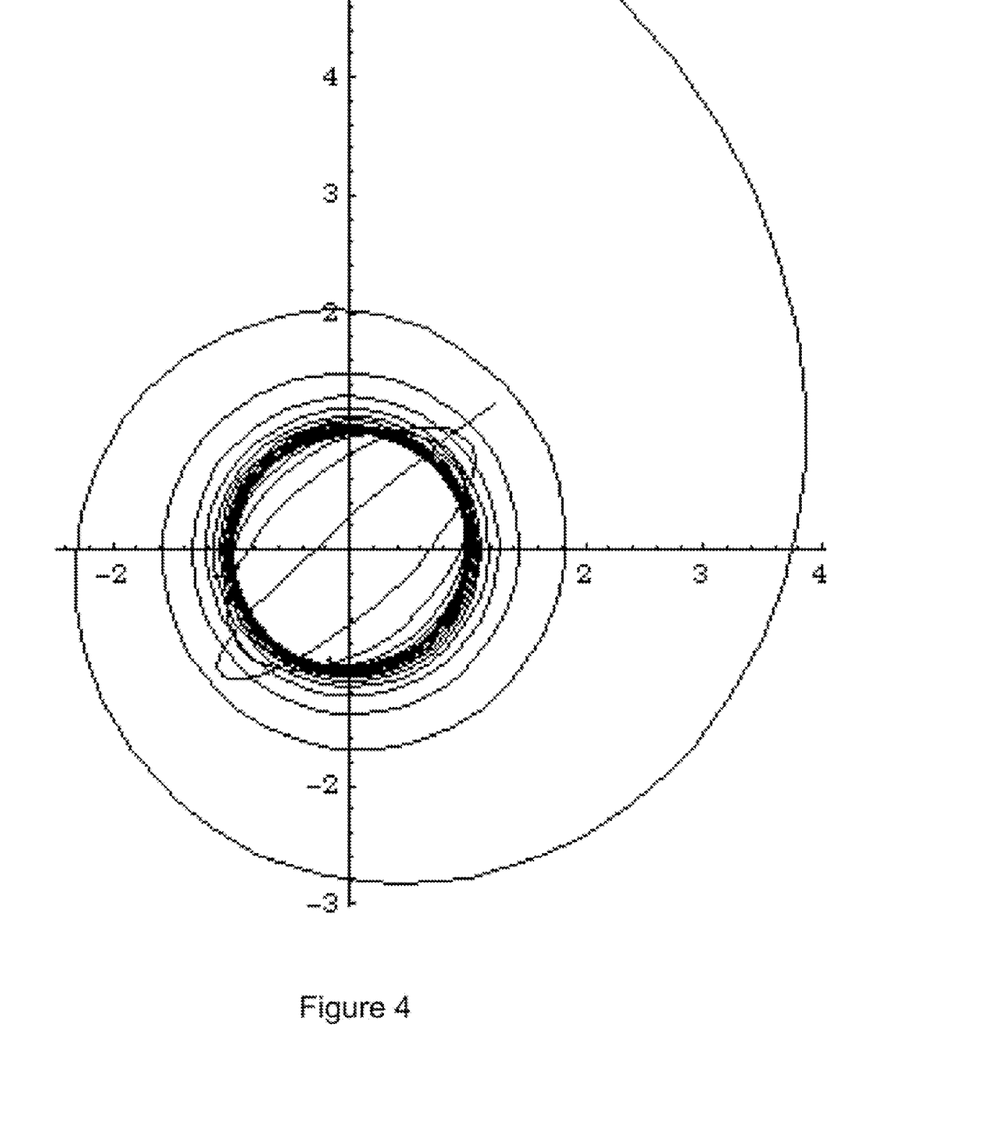
FIG. 4 shows calculated unstable growth of whirl instability without anisotropic stiffness for stabilization
Figure 5:
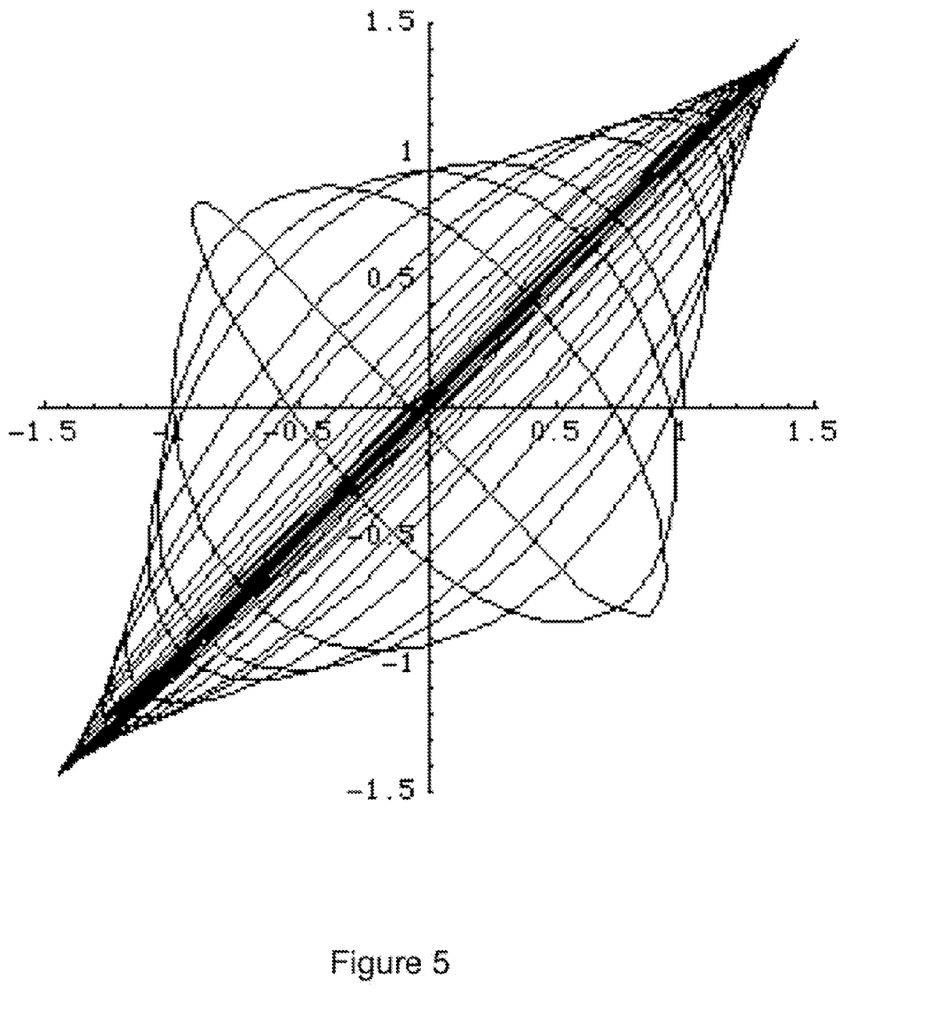
FIG. 5 shows calculated response to transverse displacement for rotating system stabilized against whirl instability by anisotropy of bearing stiffness.

FIG. 4 is a computer plot showing a computed whirl unstable behavior (outward spiraling motion). FIG. 5 is a computer plot showing a anisotropy-stabilized case (bounded radial oscillations). In the code the rotor was given an initial small radial displacement and then its subsequent orbital motion was calculated.

Figure 6:
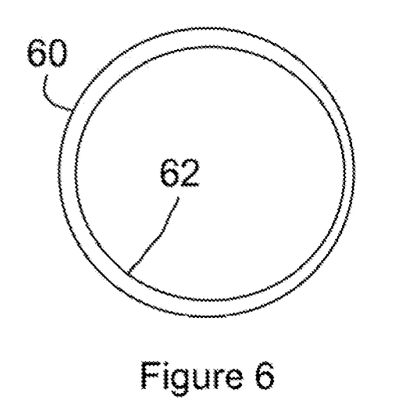
FIG. 6 shows a gap wherein the outer boundary is circular and the inner boundary is elliptical.
Figure 7:
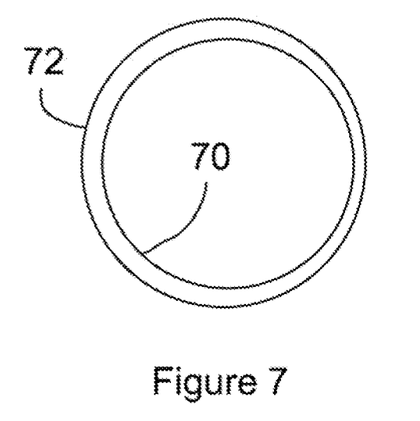
FIG. 7 shows a gap wherein the inner boundary is circular and the outer boundary is elliptical.

A general embodiment of the invention is an apparatus that includes a rotor and a stationary support structure. A plurality of (Halbach) HB arrays is attached to only one of the rotor or the stationary support structure. An array of closed circuits is attached to only the one of the rotor or the stationary support structure to which the plurality of HB arrays is not attached. As in the example of FIG. 1, the plurality of HB arrays and the array of closed circuits face each other and are separated by a gap, which gap is characterized by a first boundary next to the plurality of HB arrays and a second boundary next to the array of closed circuits. In embodiments that provide whirl stability, only one of the first boundary or the second boundary is circular and only the other of the first boundary or the second boundary is elliptical. FIG. 6 shows a gap where the outer boundary 60 is circular and the inner boundary 62 is elliptical. FIG. 7 shows a gap wherein the inner boundary 70 is circular and the outer boundary 72 is elliptical.

Based on the teachings herein, those skilled in the art will understand that alternate configurations are useable and such within the scope of this invention. For example, the HB array could be stationary and the litz wire array could be on the rotor. In some designs, this configuration may require means for cooling. Another embodiment could place the stationary piece on the outside of the rotor and the HB array or the Litz wire could be on either. This configuration may have g force problems for the element attached to the outer surface of the rotor. By placing a stationary inwardly or outwardly inclining bearing under a rotor having a matching incline, vertical stability and transverse stability would be achieved. Tilt stability can also be provided since if it did tilt, an edge of the lower part of the bearing attached to the rotor would get closer to the stationary bearing. There could be one or more inner or outer bearings like FIG. 1 for added stability for both tilt and radial movement.)

In summary, a magnetic, non-contacting, snubber bearing has been described that is capable of overcoming the lateral and axial accelerations that would be encountered in the employment of flywheel energy storage in vehicular (or other) uses where multi-g accelerations could be encountered. The following description is an aid in the understanding of the claims and can be used in reference to FIG. 1 (shown in cross-section), which is an apparatus and can be operated as a method. Thus, as an apparatus, the invention includes a rotor 12 and a stationary support structure 16. In the embodiment shown in the figure, a first plurality of (Halbach) HB arrays 10 is attached the rotor and the first array of closed circuits 14 is attached to the stationary support structure 16. It should be noted that in another embodiment, the HB arrays 10 can be attached to the stationary support 16 and the array of closed circuits 16 can be attached to the rotor 12. To achieve the requisite asymmetric boundary condition, one or the other of the HB array or the circuit array has an elliptical shape and the other has a circular shape. Note the gap 20 between the circuit array 14 and the HB array 10. The stationary element defines a fixed axis about which the rotor will rotate in stable equilibrium when the correct conditions are met. Each Halbach array of the plurality of HB arrays is designed to have a wavelength that is less than the gap, and such wavelength is selected to produce, when the rotor is rotating, repelling forces that increase exponentially when the plurality of HB arrays is displaced laterally with respect to the array of closed circuits. The rotor has a rotational axis and the stationary element has a longitudinal axis. When the rotor rotates in stable equilibrium, the rotational axis is coaxial with the longitudinal axis. Note also that in other embodiments, the stationary elements can be located outside of the rotor. In such an embodiment, one of either the HB array or the circuit array is attached to the outer surface of the rotor and the other of the HB array or the circuit array is attached to the stationary support in a manner that has the two elements facing each other separated by a gap.

The foregoing description of the invention has been presented for purposes of illustration and description and is not intended to be exhaustive or to limit the invention to the precise form disclosed. Many modifications and variations are possible in light of the above teaching. The embodiments disclosed were meant only to explain the principles of the invention and its practical application to thereby enable others skilled in the art to best use the invention in various embodiments and with various modifications suited to the particular use contemplated. The scope of the invention is to be defined by the following claims.

I claim:

1. An apparatus, comprising:
   a rotor;
   a stationary support structure;
   a first plurality of (Halbach) HB arrays attached to only one of said rotor or said stationary support structure; and
   a first array of closed circuits attached to only the one of said rotor or said stationary support structure to which said first plurality of HB arrays is not attached, wherein said first plurality of HB arrays and said first array of closed circuits face each other and are separated by a gap, wherein said gap is characterized by a first boundary next to said plurality of HB arrays and a second boundary next to said array of closed circuits, wherein only one of said first boundary or said second boundary is circular and only the other of said first boundary or said second boundary is elliptical, wherein each Halbach array of said first plurality of HB arrays has a wavelength that is less than said gap, selected to produce, when said rotor is rotating, repelling forces that increase exponentially when said first plurality of HB arrays is displaced laterally with respect to said first array of closed circuits.

2. The apparatus of claim 1, wherein said first array of closed circuits is attached to said stationary support structure and forms a first elliptical cylinder having a longitudinal axis about which said rotor will rotate in stable equilibrium, wherein said rotor is a hollow circular cylinder having a rotational axis, wherein said first plurality of HB arrays are attached to the inside surface of said cylinder and form a first cylindrical HB array that is centered on said rotational axis, wherein said first boundary is circular and said second boundary is elliptical, wherein when said rotor rotates in stable equilibrium, said rotational axis is coaxial with said longitudinal axis.

3. The apparatus of claim 1, wherein said first array of closed circuits is attached to said stationary support structure and forms a first elliptical cylinder having a longitudinal axis about which said rotor will rotate in stable equilibrium, wherein said rotor has a rotational axis, wherein said first plurality of HB arrays are attached to the outside surface of said rotor and forms a first cylindrical HB array that is centered on said rotational axis, wherein said first boundary is circular and said second boundary is elliptical, wherein when said rotor rotates in stable equilibrium, said rotational axis is coaxial with said longitudinal axis.

4. The apparatus of claim 1, wherein said first plurality of HB arrays is attached to said stationary support structure and forms a first elliptical cylinder having a longitudinal axis about which said rotor will rotate in stable equilibrium, wherein said rotor has a rotational axis, wherein said first array of closed circuits is attached to the inside surface of said rotor and is centered on said rotational axis, wherein said first boundary is elliptical and said second boundary is circular, wherein when said rotor rotates in stable equilibrium, said rotational axis is coaxial with said longitudinal axis.

5. The apparatus of claim 1, wherein said first plurality of HB arrays is attached to said stationary support structure and forms a first elliptical cylinder having a longitudinal axis about which said rotor will rotate in stable equilibrium, wherein said rotor has a rotational axis, wherein said first array of closed circuits is attached to the outside surface of said rotor and is centered on said rotational axis, wherein said first boundary is elliptical and said second boundary is circular, wherein when said rotor rotates in stable equilibrium, said rotational axis is coaxial with said longitudinal axis.

6. The apparatus of claim 1, wherein said first array of closed circuits is attached to said stationary support structure and forms a first cylinder having a longitudinal axis about which said rotor will rotate in stable equilibrium, wherein said rotor has a rotational axis, wherein said first plurality of HB arrays is attached to the inside surface of said rotor and forms a first elliptical cylinder about said rotational axis, wherein said first boundary is elliptical and said second boundary is circular, wherein when said rotor rotates in stable equilibrium, said rotational axis is coaxial with said longitudinal axis.

7. The apparatus of claim 1, wherein said first array of closed circuits is attached to said stationary support structure and forms a first circular cylinder having a longitudinal axis about which said rotor will rotate in stable equilibrium, wherein said rotor has a rotational axis, wherein said first plurality of HB arrays is attached to the outside surface of said rotor and forms an elliptical cylinder about said rotational axis, wherein said first boundary is elliptical and second boundary is circular, wherein when said rotor rotates in stable equilibrium, said rotational axis is coaxial with said longitudinal axis.

8. The apparatus of claim 1, wherein said first plurality of HB arrays is attached to said stationary support structure and forms a first circular cylinder having a longitudinal axis about which said rotor will rotate in stable equilibrium, wherein said rotor has a rotational axis, wherein said first array of closed circuits is attached to the inside surface of said rotor and form a first elliptical cylinder about said rotational axis, wherein said first boundary is circular and said second boundary is elliptical, wherein when said rotor rotates in stable equilibrium, said rotational axis is coaxial with said longitudinal axis.

9. The apparatus of claim 1, wherein said first plurality of HB arrays is attached to said stationary support structure and forms a first circular cylinder having a longitudinal axis about which said rotor will rotate in stable equilibrium, wherein said rotor has a rotational axis, wherein said first array of closed circuits are attached to the outside surface of said rotor and form a first elliptical cylinder that rotates about said rotational axis, wherein said first boundary is circular and said second boundary is elliptical, wherein when said rotor rotates in stable equilibrium, said rotational axis is coaxial with said longitudinal axis.

10. The apparatus of claim 1, wherein said rotor comprises a conical shape.

11. A method, comprising:
    providing the apparatus of claim 1, and
    rotating said rotor.

12. The method of claim 11, wherein said first array of closed circuits is attached to said stationary support structure and forms a first elliptical cylinder having a longitudinal axis about which said rotor will rotate in stable equilibrium, wherein said rotor is a hollow circular cylinder having a rotational axis, wherein said first plurality of HB arrays are attached to the inside surface of said cylinder and form a first cylindrical HB array that is centered on said rotational axis, wherein said first boundary is circular and said second boundary is elliptical, wherein when said rotor rotates in stable equilibrium, said rotational axis is coaxial with said longitudinal axis.

13. The method of claim 11, wherein said first array of closed circuits is attached to said stationary support structure and forms a first elliptical cylinder having a longitudinal axis about which said rotor will rotate in stable equilibrium, wherein said rotor has a rotational axis, wherein said first plurality of HB arrays are attached to the outside surface of said rotor and forms a first cylindrical HB array that is centered on said rotational axis, wherein said first boundary is circular and said second boundary is elliptical, wherein when said rotor rotates in stable equilibrium, said rotational axis is coaxial with said longitudinal axis.

14. The method of claim 11, wherein said first plurality of HB arrays is attached to said stationary support structure and forms a first elliptical cylinder having a longitudinal axis about which said rotor will rotate in stable equilibrium, wherein said rotor has a rotational axis, wherein said first array of closed circuits is attached to the inside surface of said rotor and is centered on said rotational axis, wherein said first boundary is elliptical and said second boundary is circular, wherein when said rotor rotates in stable equilibrium, said rotational axis is coaxial with said longitudinal axis.

15. The method of claim 11, wherein said first plurality of HB arrays is attached to said stationary support structure and forms a first elliptical cylinder having a longitudinal axis about which said rotor will rotate in stable equilibrium, wherein said rotor has a rotational axis, wherein said first array of closed circuits is attached to the outside surface of said rotor and is centered on said rotational axis, wherein said first boundary is elliptical and said second boundary is circular, wherein when said rotor rotates in stable equilibrium, said rotational axis is coaxial with said longitudinal axis.

16. The method of claim 11, wherein said first array of closed circuits is attached to said stationary support structure and forms a first cylinder having a longitudinal axis about which said rotor will rotate in stable equilibrium, wherein said rotor has a rotational axis, wherein said first plurality of HB arrays is attached to the inside surface of said rotor and forms a first elliptical cylinder about said rotational axis, wherein said first boundary is elliptical and said second boundary is circular, wherein when said rotor rotates in stable equilibrium, said rotational axis is coaxial with said longitudinal axis.

17. The method of claim 11, wherein said first array of closed circuits is attached to said stationary support structure and forms a first circular cylinder having a longitudinal axis about which said rotor will rotate in stable equilibrium, wherein said rotor has a rotational axis, wherein said first plurality of HB arrays is attached to the outside surface of said rotor and forms an elliptical cylinder about said rotational axis, wherein said first boundary is elliptical and said second boundary is circular, wherein when said rotor rotates in stable equilibrium, said rotational axis is coaxial with said longitudinal axis.

18. The method of claim 11, wherein said first plurality of HB arrays is attached to said stationary support structure and forms a first circular cylinder having a longitudinal axis about which said rotor will rotate in stable equilibrium, wherein said rotor has a rotational axis, wherein said first array of closed circuits is attached to the inside surface of said rotor and form a first elliptical cylinder about said rotational axis, wherein said first boundary is circular and said second boundary is elliptical, wherein when said rotor rotates in stable equilibrium, said rotational axis is coaxial with said longitudinal axis.

19. The method of claim 11, wherein said first plurality of HB arrays is attached to said stationary support structure and forms a first circular cylinder having a longitudinal axis about which said rotor will rotate in stable equilibrium, wherein said rotor has a rotational axis, wherein said first array of closed circuits are attached to the outside surface of said rotor and form a first elliptical cylinder that rotates about said rotational axis, wherein said first boundary is circular and said second boundary is elliptical, wherein when said rotor rotates in stable equilibrium, said rotational axis is coaxial with said longitudinal axis.

20. The method of claim 11, wherein said rotor comprises a conical shape.

21. An apparatus, comprising:
a rotor;
a stationary support structure;
a first plurality of (Halbach) HB arrays attached to only one of said rotor or said stationary support structure; and
a first array of closed circuits attached to only the one of said rotor or said stationary support structure to which said first plurality of HB arrays is not attached, wherein said first plurality of HB arrays and said first array of closed circuits face each other and are separated by a gap, wherein said gap is characterized by a first boundary next to said first plurality of HB arrays and a second boundary next to said first array of closed circuits, wherein only one of said first boundary or said second boundary is circular and only the other of said first boundary or said second boundary is elliptical.

22. The apparatus of claim 21, wherein each HB array of said plurality of HB arrays comprises a wavelength selected to provide negligible repelling force against said first array of closed circuits when said rotor is rotating in stable equilibrium but rises to a high value when said rotor is not rotating in stable equilibrium.

23. The apparatus of claim 22, wherein each HB array of said plurality of HB arrays comprises a wavelength selected to provide a desired repelling force against said first array of closed circuits only when said rotor is not rotating in stable equilibrium, wherein said desired repelling force is sufficient to return said rotor to stable equilibrium while said rotor is rotating.

* * * * *